US006036203A

United States Patent [19]

Tyus et al.

[11] Patent Number: 6,036,203

[45] Date of Patent: Mar. 14, 2000

[54] TOOL DOLLY

[76] Inventors: Sierra Tyus; Yolounda Tyus, both of 17190 Hilton St., Southfield, Mich. 48075

[21] Appl. No.: 09/282,795

[22] Filed: Mar. 31, 1999

[51] Int. Cl.[7] .......... B62B 1/04

[52] U.S. Cl. .......... 280/47.26; 340/571; 70/78

[58] Field of Search .......... 280/47.24, 47.26, 280/47.28, 651, 47.19, 659, 47.18, 47.34, 47.17, 47.35, 79.2, 63, 79.3; 312/244, 245, 293.1, 249.13, 902; 206/349; 340/571; 70/57.1, 58, 61, 78, 454

[56] References Cited

U.S. PATENT DOCUMENTS

| | | | |
|---|---|---|---|
| 5,148,150 | 9/1992 | White et al. | 340/571 |
| 5,153,561 | 10/1992 | Johnson | 340/571 |
| 5,231,376 | 7/1993 | Arcarese | 340/571 |
| 5,293,990 | 3/1994 | Masakayan | 206/1.5 |
| 5,378,005 | 1/1995 | Norton | 280/47.26 |
| 5,434,559 | 7/1995 | Smiley et al. | 340/571 |
| 5,510,768 | 4/1996 | Mann | 340/571 |
| 5,588,569 | 12/1996 | Mitomi et al. | 280/47.26 |
| 5,588,659 | 12/1996 | Boes et al. | 280/47.19 |
| 5,797,612 | 8/1998 | Baccioni | 280/47.26 |
| 5,951,127 | 9/1999 | Smith | 312/245 |
| 5,951,129 | 9/1999 | Stein | 312/249.13 |

*Primary Examiner*—Richard M. Camby
*Attorney, Agent, or Firm*—Henderson & Sturm LLP

[57] ABSTRACT

A tool dolly comprising a hand truck frame having a pair of wheels rotatably mounted on an axle in connection with a vertical frame wherein a cabinet is attached to the vertical frame. The cabinet incorporates a variety of compartments for holding useful tools and the like and a portable light source. The compartments are provided with an alarm device for independently alarming each of the compartments separately. A number of keys are provided for disabling each of the compartment alarms so that more than one user can independently access a compartment. Each lock for each compartment is provided with an indicator diode that indicates the user who last accessed the compartment. This feature helps locate tools that should be placed within the compartment but that are currently out and in use by another workman.

14 Claims, 1 Drawing Sheet

TOOL DOLLY

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of tool cabinets in general, and in particular to a portable secured tool cabinet.

2. Description of Related Art

As can be seen by reference to the following U.S. Pat. Nos. 5,148,150; 5,153,561; 5,231,376; 5,293,990; 5,434,559; and 5,510,768, the prior art is replete with myriad and diverse secured containers and cabinets.

While all of the aforementioned prior art constructions are more than adequate for the basic purpose and function for which they have been specifically designed, they are uniformly deficient with respect to their failure to provide a simple, efficient, and practical portable secured tool cabinet.

As a consequence of the foregoing situation, there has existed a longstanding need for a new and improved type of tool dolly, and the provision of such a construction is a stated objective of the present invention.

BRIEF SUMMARY OF THE INVENTION

Briefly stated, the present invention provides a tool dolly comprising a hand truck frame having a pair of wheels rotatably mounted on an axle in connection with a vertical frame wherein a cabinet is attached to the vertical frame. The cabinet incorporates a variety of compartments for holding useful tools and the like and a portable light source. The compartments are provided with an alarm device for independently alarming each of the compartments separately. A number of keys are provided for disabling each of the compartment alarms so that more than one user can independently access a compartment. Each lock for each compartment is provided with an indicator diode that indicates the user who last accessed the compartment. This feature helps locate tools that should be placed within the compartment but that are currently out and in use by another workman.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
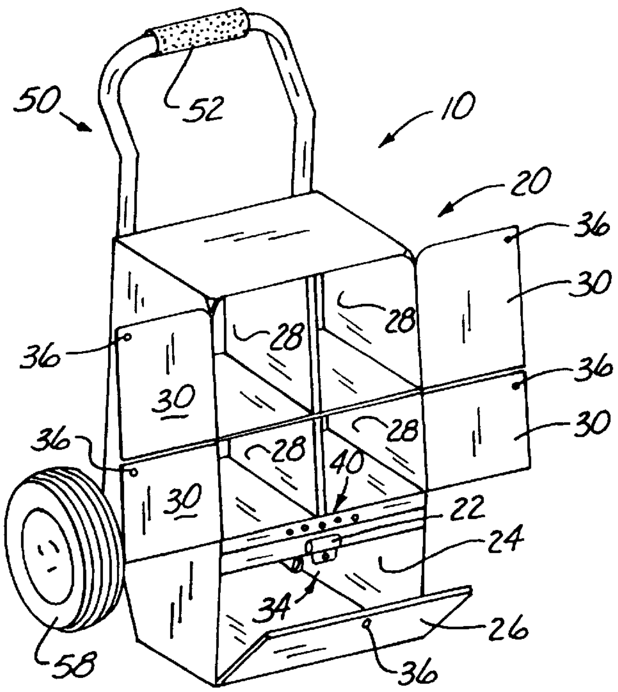
FIG. 1 is a perspective view of the tool dolly of the present invention.
Figure 2:
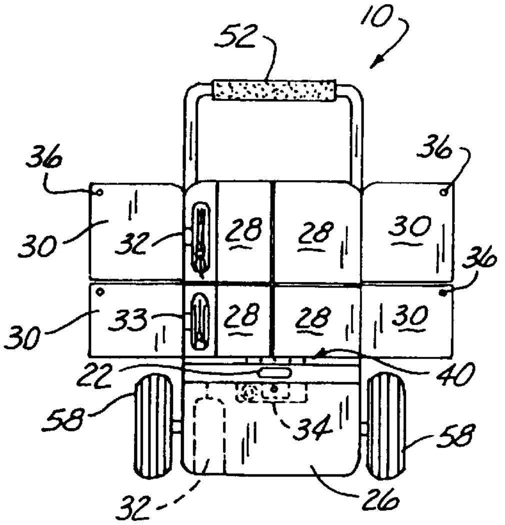
FIG. 2 is a front elevational view thereof.
Figure 3:
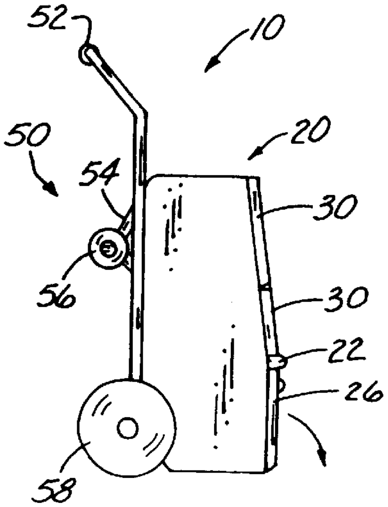
FIG. 3 is a side elevational view thereof showing the doors closed.
Figure 4:
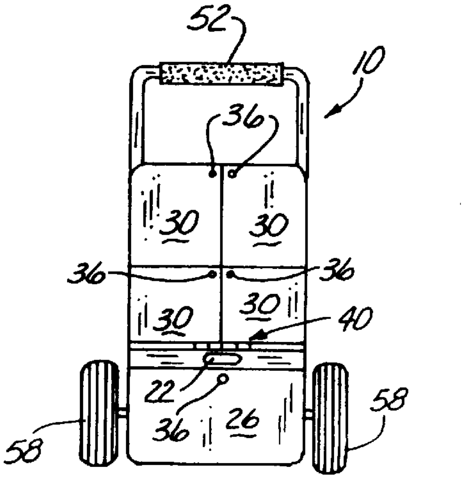
FIG. 4 is a front elevational view thereof.

As can be seen by reference to the drawings, and in particularly to FIG. 1, the that forms the basis of the present invention is designated generally by the reference number 10. The tool dolly 10 includes a heavy duty plastic or metal cabinet enclosure 20 mounted onto a dolly framework 50 featuring a rubber coated handle 52, a top mounted brace 54 with a roller 56 on each end, and large rubber wheels 58. The tool enclosure 20 includes a front mounted lifting handle 22, a bottom mounted compartment 24 with a swing down door 26 for large items such as a drill or saw, and four top mounted compartment 28 with front mounted swing open doors 30, featuring a series of different size pockets for storage of various sized items. A retractable drop light 32, as well as a retractable extension cord are mounted within the top compartments 28 and are powered by a deep cycle rechargeable battery 32. The swing open doors 30 fit snugly up to the edges of the internal pockets so as to secure all tools or items in place while the unit 10 is being transported. An alarm system 34 is activated by key locks 36 on the door 26 and 30 to each storage pocket. When the key is turned to lock a compartment 24 or 28, it completes a circuit to activate the alarm 34. If the unit is forced open without deactivating the alarm 34 with a key, an alarm horn sounds, alerting the user. Each user has a personalized key that triggers a different LED light 40 to illuminate. This shows who was last to use the tool dolly 10 so that a tool in use could easily be found.

In use, the user loads the tool dolly 10 with those tools and other items required for the task at hand, and enjoys the benefit of having an extremely versatile and easy to use method of transporting all necessary items from his vehicle to the job site and back, in one convenient trip. The sturdy rubber coated handle 52 and large rubber wheels 58 allow the unit 10 to be pushed or pulled with ease, and in the event that the job task is on an upper level, the tool dolly 10 can easily be pulled up a flight of stairs. The front mounted lifting handle 22 and rear mounted brace rollers 56 enable the assembly to easily be lifted and rolled into the rear of a truck. The design of the alarm system 34 and LED lights 40 allow the user to secure the enclosures 24 and 28 to safeguard the tools and other items while the tool dolly 10 is not attended, and to see who might have the tool that the user needed. To activate the alarm 34, the user completes the alarm circuit by locking the tool dolly 10 with his key; to deactivate the alarm 34 and retrieve tools, the user unlocks it with his key, which would also trigger his LED light 40 to illuminate. The battery powered drop light 32 and extension cord 33 allow the user to conveniently power electrical tools and give added light. The use of the tool dolly allows anyone who must move tools and other items from one place to another a far more practical method of doing so, with the added benefit of having everything organized and safe from possible theft.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A tool dolly comprising:

a frame including an attached ground wheel;

a cabinet attached to the frame, the cabinet including a compartment having a selectively lockable door;

a key lock carried on the door, the key lock being electrically connected to activate an indicator light when the door is opened;

a plurality of keys adapted to access the key lock, each of the keys being distinct from the other and each being operable to activate the indicator light in a mode distinctive of a specific key.

2. The tool dolly of claim 1 wherein the cabinet includes a plurality of compartments each having a selectively lockable door.

3. The tool dolly of claim 1 wherein the frame includes two pairs of ground wheels each pair being disposed in spaced relationship on the frame.

4. The tool dolly of claim 1 further including an emergency light disposed within the compartment, and a battery disposed within the compartment and being electrically coupled to the emergency light.

5. The tool dolly of claim 4 further including a retractable extension cord disposed within the compartment and being electrically coupled to the battery.

6. The tool dolly of claim 3 wherein the cabinet includes a plurality of compartments each having a selectively lockable door.

7. The tool dolly as in claim 4 the cabinet includes a plurality of compartments each having a selectively lockable door.

8. The tool dolly as in claim 7 including a retractable extension cord disposed within the compartment and being electrically coupled to the battery.

9. The tool dolly as in claim 2 wherein the frame includes two pairs of ground wheels each pair being disposed in spaced relationship on the frame.

10. The tool dolly as in claim 4 wherein the frame includes two pairs of ground wheels each pair being disposed in spaced relationship on the frame.

11. The tool dolly as in claim 10 further including a retractable extension cord disposed within the compartment and being electrically coupled to the battery.

12. The tool dolly as in claim 2 further including an emergency light disposed within the compartment, and a battery disposed within the compartment and being electrically coupled to the emergency light.

13. The tool dolly as in claim 3 further including an emergency light disposed within the compartment, and a battery disposed within the compartment and being electrically coupled to the emergency light.

14. The tool dolly as in claim 13 further including a retractable extension cord disposed within the compartment and being electrically coupled to the battery.

* * * * *